United States Patent [19]

Dammeyer et al.

[11] Patent Number: 5,205,620
[45] Date of Patent: Apr. 27, 1993

[54] TWO FORCE LEVELS OF MECHANICAL BRAKING FOR MATERIALS HANDLING VEHICLES

[75] Inventors: Ned E. Dammeyer; Harold A. Stammen, both of New Bremen, Ohio

[73] Assignee: Crown Equipment Corporation, New Bremen, Ohio

[21] Appl. No.: 766,785

[22] Filed: Sep. 27, 1991

Related U.S. Application Data

[63] Continuation-in-part of Ser. No. 446,269, Dec. 5, 1989, abandoned.

[51] Int. Cl.$^5$ .................................................. B60T 8/58
[52] U.S. Cl. ...................................... 303/100; 303/102; 303/93
[58] Field of Search ................ 303/9, 9.69, 9.73, 9.76, 303/95, 100, 101, 102, 103, 113 AP, 93, 3, 6.01, 5, 106

[56] References Cited

U.S. PATENT DOCUMENTS

| | | | |
|---|---|---|---|
| 2,109,167 | 2/1938 | Logan, Jr. | 303/91 |
| 3,288,538 | 11/1966 | Marcellus | 303/91 |
| 3,376,079 | 4/1966 | Ryskamp | 303/22.1 |
| 3,645,352 | 2/1972 | Stark et al. | 303/91 |
| 3,761,139 | 9/1973 | Rogers | 303/9 |
| 4,093,313 | 6/1978 | Burckhardt | 303/9.69 |
| 4,235,320 | 11/1980 | Polak et al. | 303/113 |
| 4,258,831 | 4/1981 | Weber | 188/119 |
| 4,778,223 | 10/1988 | Inoue | 188/106 P |

Primary Examiner—Matthew C. Graham
Attorney, Agent, or Firm—Biebel & French

[57] ABSTRACT

A materials handling vehicle employs a two step braking process where full brakes are applied to stop the vehicle quickly when it is traveling at a fast rate, and partial braking force is applied to stop the vehicle smoothly when it is traveling slowly. The amount of the braking force is controlled by the spring force applied to the braking shoes. Whenever the vehicle is moving at or less than a predetermined speed, only the brakes on one pair of wheels, typically the load wheel brakes, that is the brakes on the wheels under the load, will be used when braking action is requested. This will permit the vehicle to stop smoothly, and not abruptly as would be the case if full braking were to be applied. If the vehicle is moving faster than the predetermined speed, then full braking force will be applied by actuating the brakes on both pairs of wheels whenever requested by the operator or by the vehicle control system. Both the load wheel brakes and the steered wheel brakes are conventional spring applied brakes which are released by hydraulic pressure applied to individual brake cylinders.

10 Claims, 5 Drawing Sheets

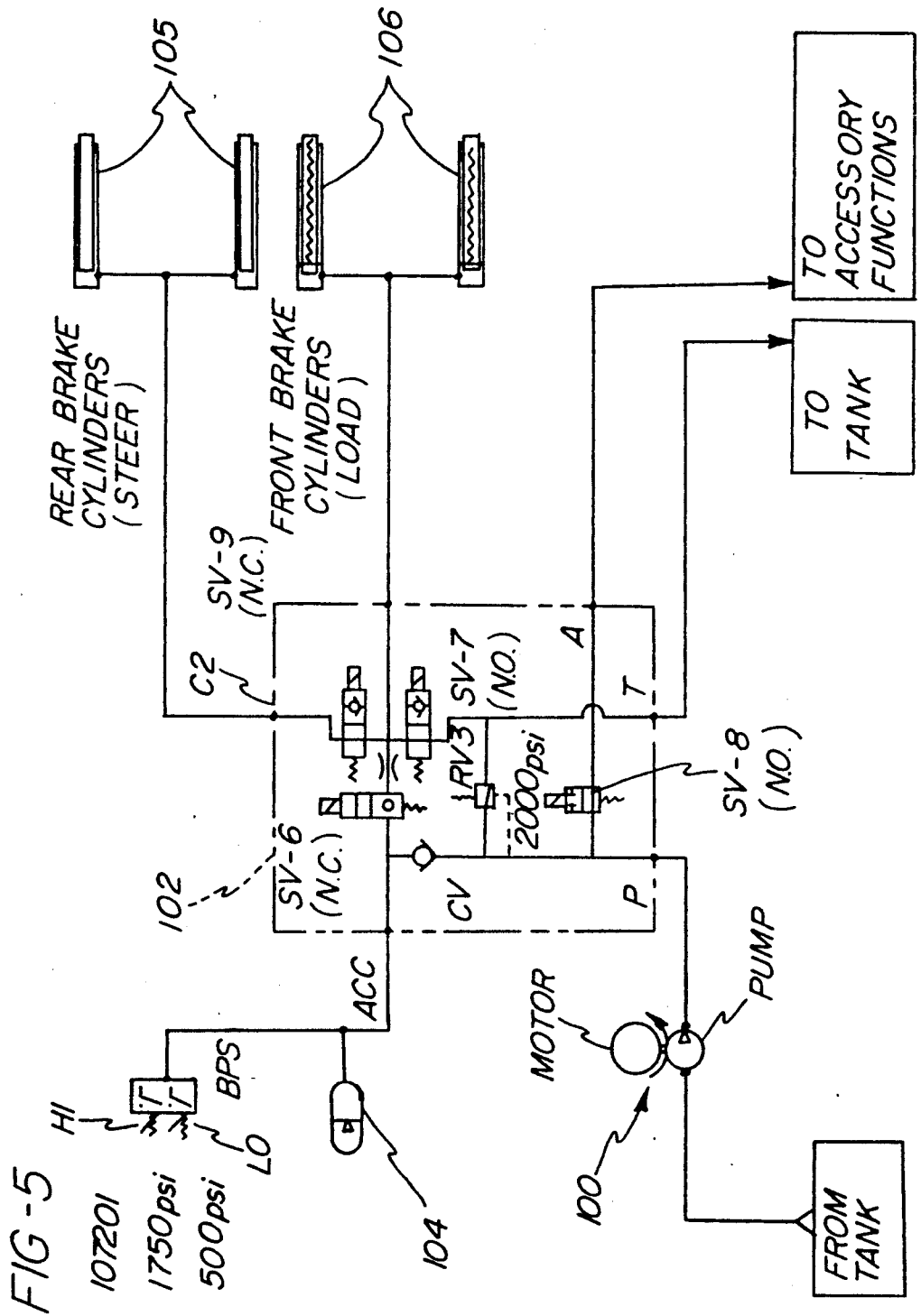

TWO FORCE LEVELS OF MECHANICAL BRAKING FOR MATERIALS HANDLING VEHICLES

RELATED APPLICATION

This application is a continuation-in-part of application Ser. No. 07/446,269, filed Dec. 5, 1989 now abandoned.

BACKGROUND OF THE INVENTION

This invention relates to an method apparatus for controlling the stopping rate of a materials handling vehicle, and particularly a turret stockpicker, or any vehicle having an elevated center of gravity.

When braking a heavy vehicle that is moving in excess of about 2 mph, full braking action is normally used. In fact, there are industry standards that specify the maximum stopping distance for vehicles of this type at higher speeds, such as 6 mph. At speeds at or below 2 mph, however, it is both unnecessary and undesirable to apply full braking force because by doing so, it will cause the vehicle to stop suddenly and this is both uncomfortable for the operator, and such action causes unnecessary strain on the vehicle.

SUMMARY OF THE INVENTION

In the present invention, a two step braking process is used with full brakes being applied to stop the vehicle quickly when it is traveling at a fast rate, and with partial braking force being applied to stop the vehicle smoothly when it is traveling slowly.

Unlike a conventional motor vehicle, the brakes of many material handling vehicles are spring actuated and are released by the application of hydraulic pressure or by an electrical solenoid. The amount of the braking force is controlled by the spring force applied to the brake shoes. Normally both the load wheel brakes will be adjusted to have the same braking force; the same is true of the steered wheel brakes, but the two pairs of brakes do not necessarily contribute the same amount to the total braking force.

In the present invention, the vehicle is provided with brakes on at least two pairs of wheels. Typically, the brakes associated with the wheels under the load handling platform of a turret stockpicker contribute about one-third to one-half the total braking force, while the brakes on the steered wheel provide the remaining braking force.

Whenever the vehicle is moving at or less than a predetermined speed, about 2 mph in the present invention, only one pair of wheels will be braked, usually the load wheel brakes, when braking action is requested. This will permit the vehicle to stop smoothly, and not abruptly as would be the case if full braking were to be applied.

If the vehicle is moving faster than the predetermined speed, then full braking force will be applied, that is both pairs of wheels will be braked, whenever requested by the operator or by the vehicle control system.

It is therefore an object of this invention to provide a method of controlling the braking force applied to a materials handling vehicle comprising the steps of sensing the speed of the vehicle, applying full braking force upon demand when the vehicle speed exceeds a predetermined speed, and applying reduced braking force upon demand when the vehicle speed is at a below a predetermined speed.

It is a further object of this invention to provide an apparatus for controlling the braking force applied to a materials handling vehicle comprising first brake means for applying a first braking force, means for actuating said first brake means, second brake means for applying a second braking force, means for actuating said second brake means, means for sensing the speed of the vehicle, means for sensing a demand for the application of braking force, circuit means responsive the same demand sensing means for controlling the operation of said brake actuating means wherein said first brake means will be actuated alone when the speed of the vehicle is at or less than a predetermined speed and wherein said first and second brake means will be actuated together when the speed of the vehicle is above a predetermined speed.

Other objects and advantages of the invention will be apparent from the following description, the accompanying drawings and the appended claims.

BRIEF DESCRIPTION OF THE DRAWINGS

FIG. 5 is a hydraulic schematic of the two force level braking system of this invention.

DESCRIPTION OF THE PREFERRED EMBODIMENT

Figure 1:
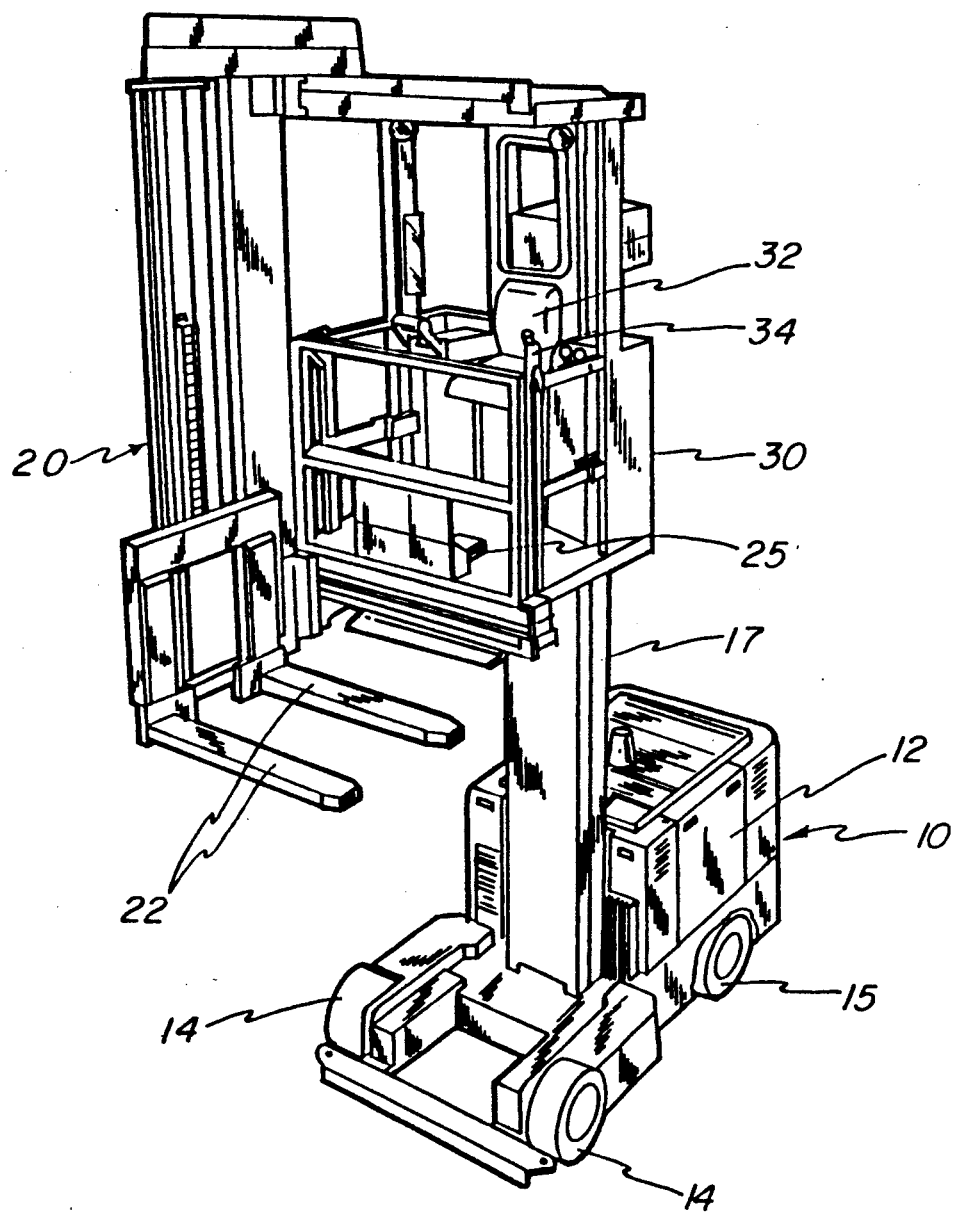
FIG. 1 is a perspective view of a materials handling vehicle, and particularly a turret stockpicker that utilizes the two force braking system of this invention.
Figure 2:
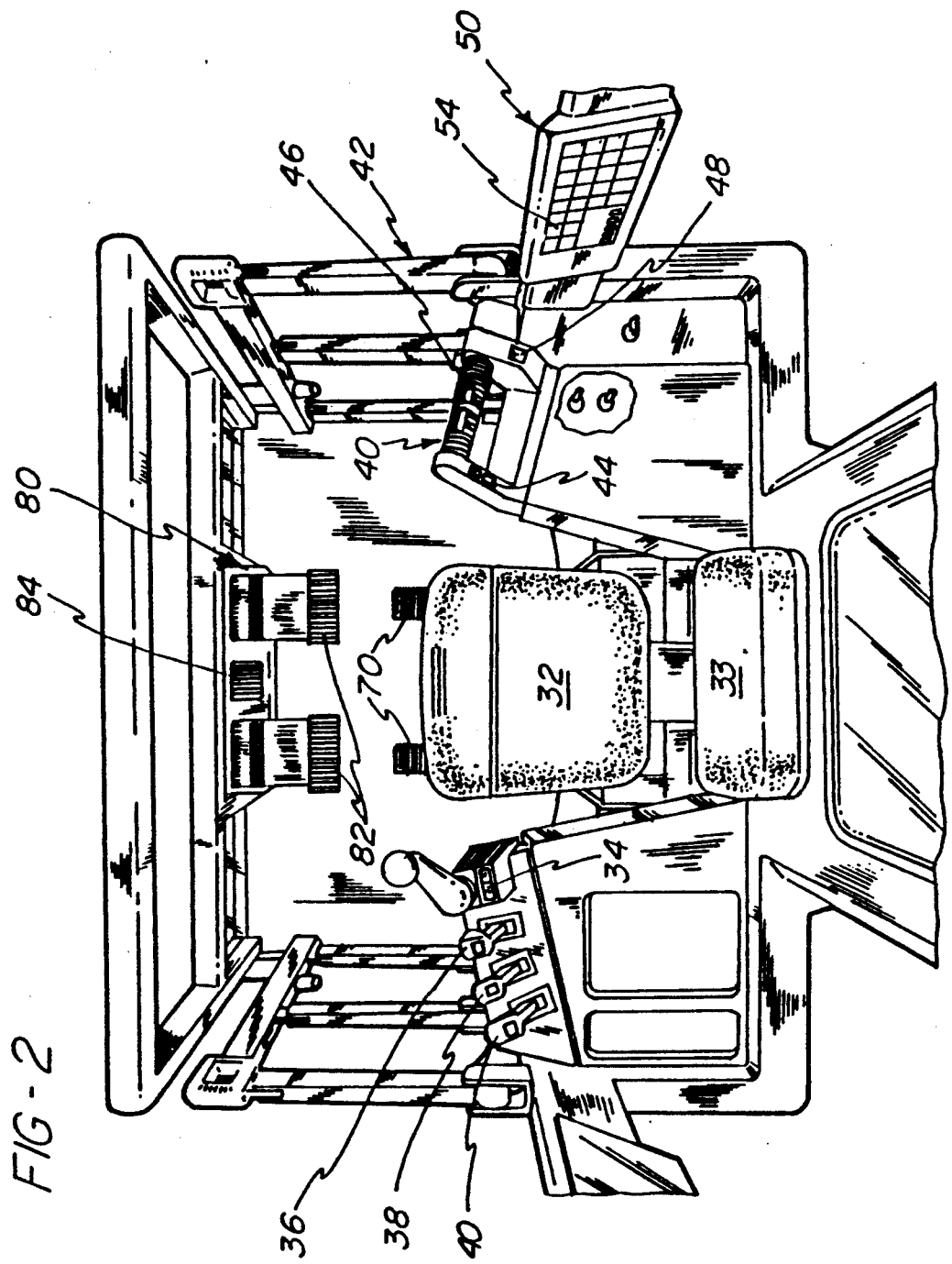
FIG. 2 is a plan view of the operator's platform and various vehicle control.

Referring now to the drawings, and particularly to FIG. 1 which illustrates a materials handling vehicle, such as a turret stockpicker, the vehicle includes a power unit 10, a load handling assembly 20, and a platform assembly 30.

Figure 3:
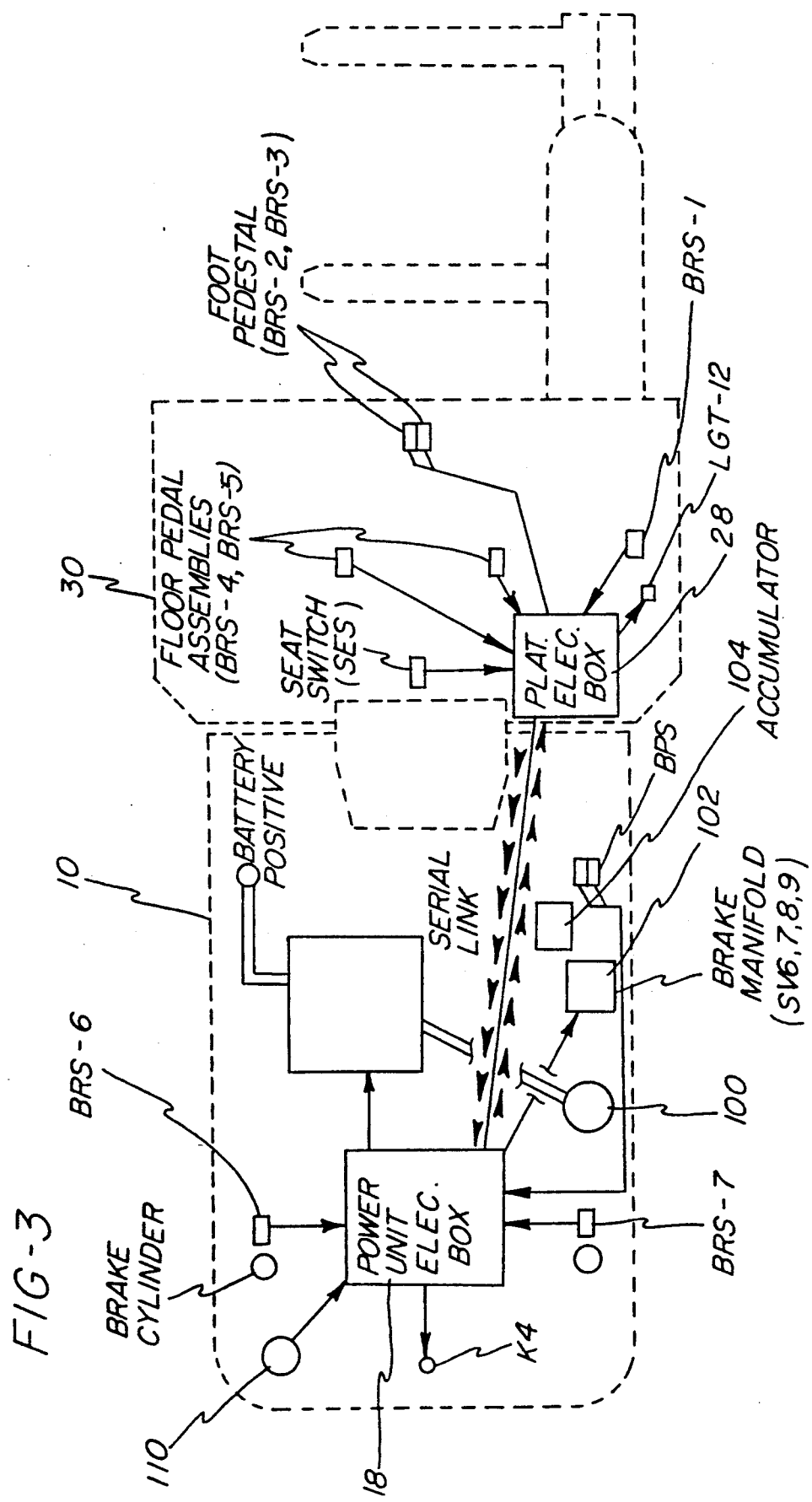
FIG. 3 is a schematic plan view of a turret stockpicker showing some of the major components of brake control system.

The power unit 10 includes a power source, such as a battery unit 12, a pair of load wheels 14 positioned under the platform assembly, a pair of steered wheels 15 positioned under the rear end of the power unit 10 with each wheel being driven by a traction motor, a mast 17 on which the platform assembly 30 rides, and a power unit electronic control unit 18 (FIG. 3).

The load handling assembly 20 includes a pair of lift forks 22 which may be raised and lowered, and also rotated relative to the platform assembly.

The platform assembly 30 includes a seal 32, and back rest 33, from which the operator can operate various controls. A switch SES (FIG. 4) is associated with the seat 32 and is operated by the weight of the operator. On the left, the controls include a steering tiller 34, a fork raise and lower control 36, a fork traverse, retract and extend control 38, and a pivot control 40. On the right, the operator is provided with a traction motor control 42, which includes a horn switch 44, an accelerator twist grip and palm switch 46, and a power disconnect switch 48. An indicator control panel 50 to the right of the operator includes various indicator lamps and control switches, such as parking brake switch 54. The platform includes an electronics package 28 that is interconnected with the power unit electronics package 18 by means of a serial link through appropriate cable.

If standing, the operator controls braking by releasing either of the foot pedals 70 located on the platform floor; dead man switches are also operated by the foot pedals for controlling auxiliary function of the vehicle. If seated, the operator used the pedals located on the pedestal 80; dead man pedals 82 must be pressed for the operator to move the vehicle and perform certain control functions; braking is controlled by the service brake pedal 84.

Both pairs of wheels, the load wheels 14 and the steered wheels 15, are provided with conventional spring applied brakes which are hydraulically released. The load wheel brakes are actuated by internal springs and are not externally adjustable but are set to provide approximately one-third to one-half of the total braking force of the vehicle. The steered wheel brakes are provided with externally adjustable springs that are set to provide, along with the load wheel brakes, sufficient braking action to comply with the industry standards applicable to this type of vehicle. Both sets of brakes are released by hydraulic pressure applied to individual brake cylinders associated with each brake. These are conventional brakes as used with material handling vehicles and for this reason, the brakes, the associated brake applying springs, and the brake release hydraulic cylinders are not described further in detail.

Figure 4:
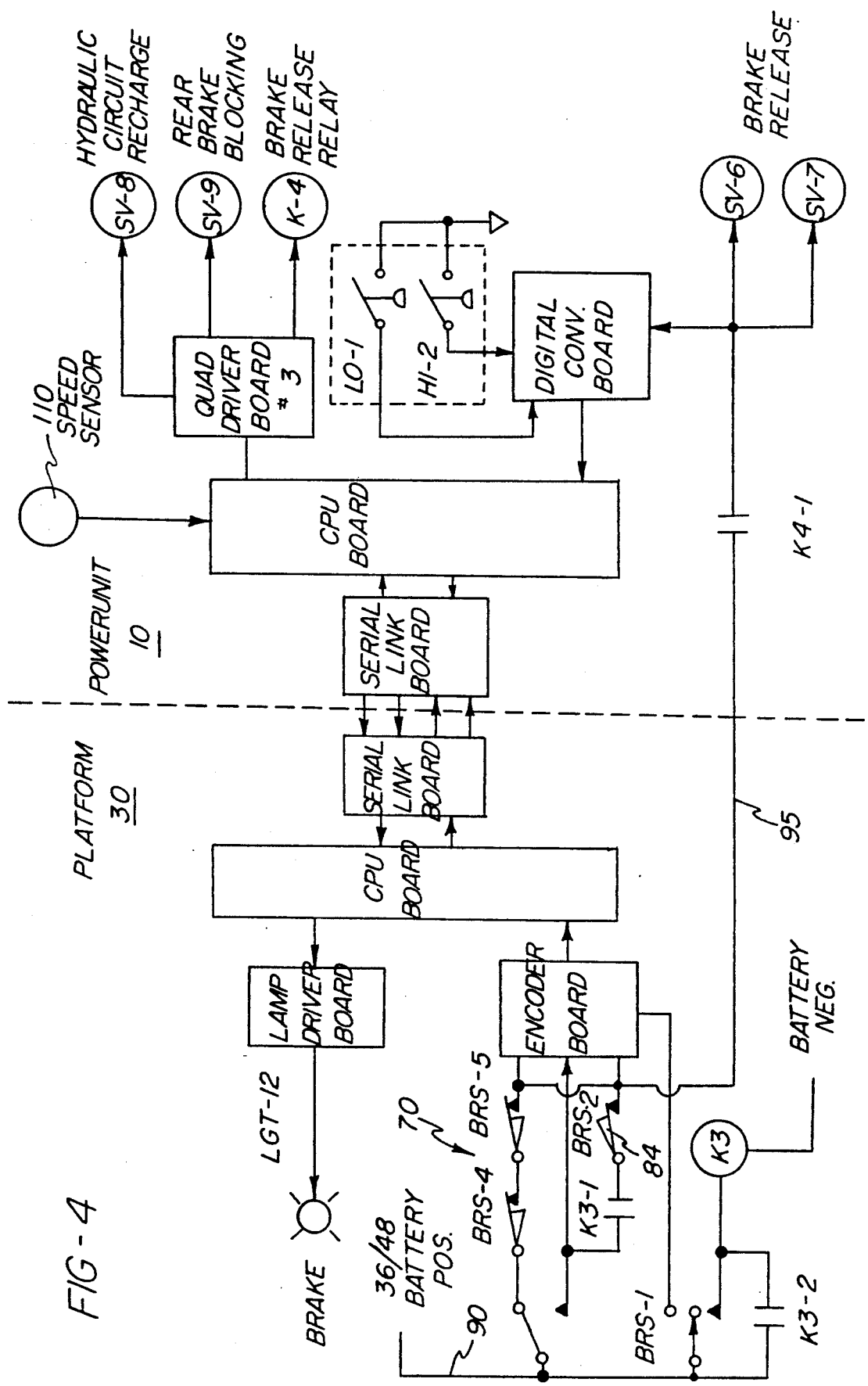
FIG. 4 is a simplified electrical block diagram showing the various components comprising the present invention.

Referring now to the simplified plan view of FIG. 3, the electrical block diagram of FIG. 4, and the hydraulic schematic diagram of FIG. 5, hydraulic pressure for the brake cylinders is initially supplied by an auxiliary pump and motor 100 to a brake manifold 102 and accumulator 104. The manifold has attached thereto brake release solenoids SV-6 and SV-7, hydraulic recharge solenoid SV-8 and rear brake blocking solenoid SV-9. The brake release solenoids, SV-6 and SV-7 when actuated, apply hydraulic pressure to brake release cylinders 105 and 106 (FIG. 5) to overcome the force of the brake springs to release the brakes.

The pressure in the manifold is monitored by a hydraulic pressure switch BPS, and if the pressure drops below a desired level, the power unit electronic circuitry will energize the motor and pump 100 to replenish the hydraulic pressure in the system through solenoid SV-8.

Brakes may be applied by the operator during normal operation by operating one of the two available foot pedals 70 or 84. If the operator is seated, then the service brake pedal 84 controls the brake switch BRS-2 which in turn will control the brakes; if the operator is standing, either of the floor pedals 70 control the operation of brake switches BRS-4 and BRS-5 which in turn will control the brakes.

As shown in the simplified electrical block diagram of FIG. 4, the seat switch SES directs power from line 90 to either the series connected floor switches BRS-4 and BRS-5 operated by pedals 70 or through relay contract K3-1 to the pedestal service brake switch BRS-2 operated by pedal 84. These switches are connected to a common line 95 which is connected directly to brake release solenoids SV-6 and SV-7 through relay contacts K4-1. These solenoids apply hydraulic pressure to overcome the springs acting to apply the brakes. The switches BRS-4 and BRS-5 are normally open switches, switch BRS-2 is normally closed.

If the operator is standing, the seat switch SES will be in the position shown, and battery voltage on line 90 will be applied directly to the floor pedal brake switches BRS-4 and BRS-5. If these switches are closed, that is, if the operator is standing on the pedals 70, then the battery voltage will be applied through relay contacts K4-1 to activate the brake release solenoids SV-6 and SV-7. Relay K4 is normally energized, except that the parking brake switch BRS-1 is operated or some other function of the power unit control circuit (not part of the present invention) requires the brakes to be applied. If the operator releases either brake pedal 70, switch BRS-4 or BRS-5 will open, the brake release solenoids will be deactivated, and the vehicle will be stopped.

On the other hand, if the operator is seated, the seat switch SES close and battery voltage will be applied to relay contacts K3-1. Relay K3 is energized by operation of the parking brake switch BRS-1, when moved to the momentary down position, and this in turn causes normally open contacts K3-1 and K3-2 to close. Contacts K3-2 provide a latching circuit in parallel to the momentary contacts of the parking brake switch. Contacts K3-1 supply battery power to the pedestal brake switch BRS-2. With the operator in the seat and the relay K3 energized, the brake release solenoids will be energized. Pressing on the brake pedal 84 will open the circuit through switch BRS-2 and deenergize the brake release solenoids, causing the brakes to be applied.

As illustrated in FIG. 4, the power unit electronics package 18 is provided with a vehicle speed input from speed sensor 110. If the speed is at or above the predetermined speed, typically 2 mph, then the rear (steered wheel) brakes will not be applied when braking is requested by the operator operating either pedal 70 or 84.

Referring specifically to FIG. 5, brake manifold 102 distributes hydraulic fluid from the pump and motor 100 to a pair of rear (steered wheel) brake release cylinders 105 and a pair of front (load wheel) brake release cylinders 106. The pump and motor 100 supplies hydraulic fluid under pressure from a supply tank (not shown) to the input port P where the fluid is provided to output port ACC through a check valve CV; the port ACC is connected to an accumulator 104 which maintains hydraulic pressure when the motor and pump 100 are not energized.

The hydraulic pressure switch BPS senses when the pressure in the accumulator drops below 500 psi, which causes switch LO (FIG. 4) to actuate and that will energize the motor and pump 100; when the pressure exceeds 1750 psi, switch HI closes and the motor and pump 100 will be deenergized. Thus, hydraulic pressure for the braking system is always maintained even though other auxiliary functions of the vehicle have not been performed.

Hydraulic fluid is also supplied to relief valve RV3 which prevents component damage by releasing the pressure in the brake circuit whenever the pressure exceeds 2000 psi. Relief valve RV3 is connected to port T which in turn is connected to the supply tank. The check valve CV prevents back flow of hydraulic fluid from the brake cylinders from flowing back toward the pump.

Release of both brakes is done by energizing solenoid valves SV-6 and SV-7. Solenoid valve SV-6 is a normally closed valve which, when energized, will allow hydraulic pressure to flow to both parts C1 and C2 and thus to the brake release cylinders 105 and 106. Solenoid valve SV-7 is operated at the same time as valve SV-6, as shown in FIG. 4. Solenoid valve SV-7 is a normally open valve, and when deenergized, prevents hydraulic pressure from being applied to the brake release cylinders. As shown in FIG. 5, this valve returns hydraulic fluid to the tank through port T; when energized, it prevents flow of fluid to port T and thus permits the brakes to be released.

Solenoid valve SV-8 is a normally open valve in the recharge circuit. This valve is used to keep the brake circuit charged when the brakes are being used frequently without the operator working the auxiliary accessory functions. When energized, the brake circuit may be recharged without the need to operate an accessory function. As shown, the valve SV-8 is connected to port A.

Applying the brakes is accomplished by simultaneously deenergizing valves SV-6 and SV-7. When valve SV-6 deenergizes, it closes, thus removing hydraulic pressure from ports C1 and C2 of the manifold 100. Valve SV-7 will open and allows the pressure in the cylinders 105 and 106 to be released to the supply tank through port T. Removal of hydraulic pressure from the cylinders 105 and 106 will allow the springs in the brakes to stop the vehicle.

The rear or steer wheel brakes are prevented from operating at slower speeds by the action of solenoid valve SV-9, a normally open valve. When this valve is energized, it closes and hydraulic fluid in the brake release cylinder is prevented from returning to the supply tank through the circuit that extends from port C2 through valves SV-9 and SV-7 to port 7. Thus, the rear brakes will not be applied while the valve SV-9 is energized.

While in the turret stockpicker illustrated in the drawings, solenoid SV-9 is energized to prevent release of the hydraulic pressure that overcomes the brake spring to maintain the steered wheel brakes released, and thus soften the braking action, other means could be provided to control the application of the brakes within the spirit of this invention to provide either full braking force, by actuating both front and rear brakes when the vehicle is traveling more that a predetermined speed, or to provide limited braking force by actuating only the front (load wheel) brakes when the speed is at or below the predetermined speed.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method of controlling the braking force applied to a materials handling vehicle having at least two pairs of wheels, the method comprising the steps of
sensing the speed of the vehicle,
applying braking force to both pairs of wheels upon demand when the vehicle speed exceeds a predetermined speed, and
applying braking force upon demand only to one pair of wheels when the vehicle speed is at or below a predetermined speed.

2. The method of claim 1 wherein the vehicle is provided with a pair of load bearing wheels and a pair of steered wheels, and wherein only said pair of load bearing wheel is braked when the vehicle speed is at or below a predetermined speed.

3. Apparatus for controlling the braking force applied to a materials handling vehicle having at least two pairs of wheels, the method comprising
first brake means for applying a first braking force to one pair of wheels,
first actuating means for actuating said first brake means,
second brake means for applying a second braking force to another pair of wheels,
second actuating means for actuating said second brake means,
means for sensing the speed of the vehicle,
means for sensing a demand for the application of braking force,
circuit means responsive to said demand sensing means for controlling the operation of said first actuating means and said second actuating means wherein one of said first and second brake means will be actuated alone when the speed of the vehicle is at or less than a predetermined speed and wherein said first and second brake means will be actuated together when the speed of the vehicle is above a predetermined speed.

4. Method of controlling the braking force applied to a materials handling vehicle having a pair of load bearing wheels and a pair of steered wheels, the method comprising the steps of
sensing the speed of the vehicle,
applying braking force to both pairs of wheels upon demand when the vehicle speed exceeds a predetermined speed, and
applying braking force upon demand only to said pair of load wheels when the vehicle speed is at or below a predetermined speed.

5. Apparatus for controlling the braking force applied to a materials handling vehicle having a pair of load bearing wheels and a pair of steered wheels, the method comprising
first brake means for applying a first braking force to said pair of load bearing wheels,
first actuating means for actuating said first brake means,
second brake means for applying a second braking force to said pair of steered wheels,
second actuating means for actuating said second brake means,
means for sensing the speed of the vehicle,
means for sensing a demand for the application of braking force,
circuit means responsive the said demand sensing means for controlling the operation of said first actuating means and said second actuating means whereon said first brake means will be actuated alone when the speed of the vehicle is at or less than a predetermined speed and wherein said first and second brake means will be actuated together when the speed of the vehicle is above a predetermined speed.

6. The apparatus of claim 5 wherein said first and second brake actuating means includes springs for actuating said first and second brake means and hydraulic cylinder means for applying a force against said springs to release said first and second brake means.

7. The apparatus of claim 6 further including blocking valve means for preventing release of hydraulic pressure from said hydraulic cylinder means associated with said second brake means when the speed of said vehicle is above a predetermined speed.

8. The apparatus of claim 5 wherein said first brake means applies approximately one-half the braking force of said second brake means.

9. The apparatus of claim 5 wherein said predetermined speed is 2 mph.

10. The apparatus of claim 5 further including means for automatically maintaining hydraulic pressure to said brake cylinders.

* * * * *